United States Patent
Chen et al.

(10) Patent No.: US 11,853,566 B2
(45) Date of Patent: Dec. 26, 2023

(54) MANAGEMENT METHOD AND SYSTEM FOR ADDRESS SPACE OF LOW DELAY FILE SYSTEM AND MEDIUM

(71) Applicant: SUN YAT-SEN UNIVERSITY, Guangdong (CN)

(72) Inventors: Zhiguang Chen, Guangdong (CN); Yutong Lu, Guangdong (CN)

(73) Assignee: SUN YAT-SEN UNIVERSITY, Guangdong (CN)

( * ) Notice: Subject to any disclaimer, the term of this patent is extended or adjusted under 35 U.S.C. 154(b) by 86 days.

(21) Appl. No.: 17/638,196

(22) PCT Filed: Jun. 23, 2020

(86) PCT No.: PCT/CN2020/097671
§ 371 (c)(1),
(2) Date: Feb. 25, 2022

(87) PCT Pub. No.: WO2021/208239
PCT Pub. Date: Oct. 21, 2021

(65) Prior Publication Data
US 2022/0404990 A1 Dec. 22, 2022

(30) Foreign Application Priority Data
Apr. 14, 2020 (CN) .......................... 202010290402.5

(51) Int. Cl.
G06F 12/00 (2006.01)
G06F 3/06 (2006.01)
G06F 16/13 (2019.01)

(52) U.S. Cl.
CPC ............ *G06F 3/0631* (2013.01); *G06F 3/064* (2013.01); *G06F 3/0611* (2013.01);
(Continued)

(58) Field of Classification Search
CPC ...... G06F 3/0631; G06F 3/0611; G06F 3/064; G06F 3/0643; G06F 3/0673; G06F 16/13
See application file for complete search history.

(56) References Cited

U.S. PATENT DOCUMENTS

| | | | |
|---|---|---|---|
| 5,634,050 A * | 5/1997 | Krueger | G06F 11/1435 707/E17.037 |
| 2015/0095383 A1* | 4/2015 | Zhai | G06F 3/0683 707/823 |
| 2019/0220443 A1* | 7/2019 | Wang | G06F 16/116 |

FOREIGN PATENT DOCUMENTS

| | | |
|---|---|---|
| CN | 104516929 | 4/2015 |
| CN | 109254733 | 1/2019 |

(Continued)

OTHER PUBLICATIONS

"International Search Report (Form PCT/ISA/210) of PCT/CN2020/097671", dated Jan. 13, 2021, with English translation thereof, pp. 1-4.

*Primary Examiner* — John A Lane
(74) *Attorney, Agent, or Firm* — JCIP GLOBAL INC.

(57) ABSTRACT

A low-latency file system file address space management method and system, and a medium. The method of the present invention comprises: generating a superblock and a block group allocation table from an address space of a storage device, wherein the superblock stores file system information and the allocation situation of block groups on a liner address space of the storage device, and the block group allocation table is used for marking the allocation situation of data blocks in the corresponding block group; when a file is created, dynamically creating or selecting a corresponding block group according to the size of a specified data block and allocating the data block; and writing file data into the allocated data block, and updating the block group allocation table and information of the superblock.

10 Claims, 3 Drawing Sheets

(52) U.S. Cl.
CPC .......... *G06F 3/0643* (2013.01); *G06F 3/0673* (2013.01); *G06F 16/13* (2019.01)

(56) References Cited

FOREIGN PATENT DOCUMENTS

| | | |
|---|---|---|
| CN | 109726145 | 5/2019 |
| CN | 10221782 | 9/2019 |
| CN | 110427304 | 11/2019 |

\* cited by examiner

MANAGEMENT METHOD AND SYSTEM FOR ADDRESS SPACE OF LOW DELAY FILE SYSTEM AND MEDIUM

CROSS-REFERENCE TO RELATED APPLICATION

This application is a 371 of international application of PCT application serial no. PCT/CN2020/097671, filed on Jun. 23, 2020, which claims the priority benefit of China application no. 202010290402.5, filed on Apr. 14, 2020. The entirety of each of the above mentioned patent applications is hereby incorporated by reference herein and made a part of this specification.

TECHNICAL FIELD

The present invention belongs to the field of file systems of mass storage, and in particular relates to a management method and system for an address space of a low delay file system and a medium. A novel data structure is adopted to manage a physical address space of the file system, so that read-write delay of files is reduced remarkably.

DESCRIPTION OF RELATED ART

A local file system for a storage device is a basis of all data storage and management systems. For example, mainstream databases are established on the file system. A allocated file system depends on the local file system to realize data organization on the device. A big data storage system represented by Hbase and Dynamo is either built on the allocated file system or calls the local file system directly to read and write data on the storage device. Briefly, performance of the local file system is of critical importance to all data storage and management systems.

The local file system may be substantially divided into two assembles in structure: name space management and address space management. The major function of the name space management is to maintain a menu structure to provide an operating interface of a file system to a user. The address space management is mainly responsible for organizing data on the storage device. Generally speaking, no matter what technical means is adopted to realize the storage device, a device manufacturer will abstract the physical address space to a linear logic address space, and the address space management module is responsible for organizing user data and metadata of the file system on the linear logic address space.

Specifically, the file system stores a lot of files. Each file is abstracted to a linear byte stream. The byte stream is divided into blocks with fixed length, for example, an Ext4 file system divides the file into blocks of 1 KB in size by default and allows a user in an optional mode to divide the file into blocks of 2 KB or 4 KB in size. Correspondingly, the logic address space of a bottom storage device is also divided into blocks with fixed size, for example, the minimum read-write unit of a disc is 512 bytes, but the file system may formats the disc to blocks of 1 KB, 2 KB, 4 KB and the like in size. The address space management of the file system plays an important role of maintaining a corresponding relation between byte stream blocks of the file and the logical address space blocks of the storage device. For example, a 1 MB file may be divided into 1024 1 KB blocks. Assuming that the bottom storage device is also divided into 1 KB blocks, the file needs to occupy 1024 blocks on the storage device. The corresponding relation between the 1024 blocks of the file and the 1024 blocks occupied by the file on the storage device is maintained by an address space management module.

Different file systems adopt different address space management methods. An early FAT file system organizes the data blocks on the disc in form of linked pointers, i.e., a tail of each data block has a pointer pointed to the next data block, and all data blocks are linked via the pointer. When the file is read and written, all the data blocks may be found in sequence along the linked pointer. The data block organization mode is simple in logic but low in efficiency. As far as one file is concerned, no matter which data block therein is read, it is necessary to start to search in sequence from the first data block, and the read-write performance is gradually reduced as the file becomes large.

The Ext serial file systems (for example, Ext2, Ext3 and Ext4) maintain dedicated pointers to record the data blocks occupied by the files. 15 pointers are reserved in inode of each file, wherein 12 pointers are configured to directly point to the data blocks and the 12 pointers are also called direct pointers. If the data blocks pointed by the 12 pointers are not enough to store data (i.e., the size of the file exceeds 12 data blocks) corresponding to the file, the 13rd pointer is started, and the pointer is also called a primary indirect pointer. The primary indirect pointer points to one data block on the storage device. What is stored in the data block is not user data but a pointer pointing to other data blocks. Assuming that the storage device is formatted by the file system into data blocks with the size of 4 KB, each pointer occupies 4 bytes, the data block pointed by the primary indirect pointer may store 1024 pointers. These pointers point to 1024 data blocks, so that the size of a single file capable of being supported by the file system may be increased remarkably. If the primary indirect pointer may still not meet the demand of the file, i.e., the size of the file exceeds 1036 (1024+12) data blocks, the 14th pointer is started, and the pointer is also called a secondary indirect pointer. The secondary indirect pointer points to one data block on the storage device. What is stored in the data block is not user data but a lot of primary indirect pointers. Assuming that the storage device is formatted by the file system into data blocks with the size of 4 KB, each pointer occupies 4 bytes, each data block may contain 1024 pointers. Thus, each secondary indirect pointer may index 1024 primary indirect pointers and each primary indirect pointer may index 1024 data blocks. By introducing the secondary indirect pointers, the maximum file capable of being supported by the file system may be increased to 1024*1024 data blocks again. If the data blocks contained in a big file exceed the index ability of the secondary indirect pointer, the 15th pointer, i.e., a third indirect pointer, in inode may be started. The data block pointed by the third indirect pointer contains 1024 secondary indirect pointers, and finally, the maximum file capable of being supported by the file system may be increased to 1024*1024*1024 data blocks again. In a word, through three-time indirect addressing, the file capable of being supported by the Ext serial file system at most contains 12+1024+1024*1024+1024*1024*1024 data blocks. If each data block is 4 KB, the single file with a size of 4 TB may be stored. The above storage capacity may meet application demands in most scenes.

Multi-time indirect addressing may expand the maximum file capable of being supported by the file system remarkably. However, performance of file access may not be guaranteed. Specifically, when an application program reads a certain data block of a big file, it may be necessary to acquire the inode, the third indirect pointers, the secondary indirect pointers and the primary indirect pointers of the file in sequence so as to finally obtain data block numbers where the target data is and read the data therefrom. In brief, a data read request sent by the application program finally initiates five read operations (respectively four indirect pointer reading and once data reading) of the storage device. As the five read operations have a dependency relationship and may not be initiated simultaneously, the IO performance capable of being acquired by the application program is only ⅕ of the actual performance of the storage device under the worst condition.

BtrFS adopts a B+ tree to index all data blocks occupied by each file, i.e., each file establishes one B+ tree. The data blocks occupied by the file are inserted into the corresponding B+ trees, and search is made in the B+ trees according to offset of the read-write position when the file is read and written till the corresponding data blocks are found. The above technology is hard to cope with the scene with the large file similarly. Along with increase of the file, the corresponding B+ tree is deeper and deeper, and the delay of searching for the target data blocks in the B+ tree is larger and larger, so that the read-write performance of the file is declined.

In order to solve the problem that the read-write delay of the data blocks in the big file scene is increased, the Ext4 file system puts forward an Extent concept, reduces index expenses of the data blocks and avoids multi-time indirect pointers (for example, secondary index pointers and third indirect pointers). Specifically, different from the fixed length data blocks usually adopted in a conventional file system, Extent is variable in length, and specifically, it is integral multiples of the fixed length data blocks. For a big file, a small amount long Extent may be adopted to record the data blocks occupied on the storage device. As Extent is relatively long, a big file may be represented by using a small amount of Extent. When the data blocks of the file are read and written, the corresponding data blocks may be found with very small index expenses. Generally speaking, as data corresponding to a series of continuous writing operations of one file will be merged into one Extent, the more the continuously written data is, the greater the length of Extent is, and the more favorable the performance optimization of reading and writing the file is. However, current operating systems usually support multiple cores and multiple threads. One file system often has the problem of concurrently writing a lot of files simultaneously. Thus, the continuous writing operation for a certain special file is often disorganized, so that it is hard to establish a long Extent. Cross disordered writing of multiple files will reduce the optimization effect of Extent technology remarkably.

In a word, the current file systems for large files hardly meet the low delay requirements of data access and the data access delay is a critical factor that affects the application performance in many scenes. For example, many applications merge a lot of small files into a big file which is stored in the file system. Random access to these small files by an upper application is turned into random access to different offset addresses of the big file. At the time, random access delay to the big file becomes a critical factor that affects the application performance. Similarly, in a high performance computing scene, the application program often sends discontinuous read-write request with fixed intervals to the big file. In the scene, the application raises a very high claim on data access delay (rather than bandwidth). For the above application scenes, it is of significance to design a low delay local file system.

BRIEF SUMMARY OF THE INVENTION

Aiming to solve the technical problem, the present invention provides a management method and system for an address space of a low delay file system and a medium. Which data blocks occupied by one file on the storage device may be acquired by one IO operation rather than reading the indirect pointers by the Ext file system with at most four IO operations. By means of the optimized measure, the read-write delay of the file may be remarkably reduced, the addressing expenses of reading and writing the file may be remarkably reduced and the sequence of reading and writing the file may be remarkably improved, so that the read-write performance is improved. In order to solve the above problems, the present invention adopts the following technical solutions:

A low-latency file system file address space management method, comprising implementation steps:

1) Generating a superblock and a block group allocation table by the address space of a storage device, wherein the superblock stores an allocation condition of file system information and blocks on the linear address space of the storage device, and the block group allocation table is configured to mark an allocation condition of data blocks in a corresponding block group; and 2) Dynamically establishing or selecting the corresponding block group and allocating the data block according to an appointed data block size when a file is established, and writing the file data into the allocated data block and updating information of the block group allocation table and the superblock.

Optionally, the appointed data block size is an integer power of 2 (KB).

Optionally, a detailed step of dynamically establishing or selecting the corresponding block group and allocating the data block according to an appointed data block size in Step 2) comprises:

A1) Judging whether there is still a block group with the appointed data block size of a spare data block or not, if yes, taking the block group as a target block group, and if no, establishing a new block group with the appointed data block size, and taking the new block group as the target block group;

A2) Allocating the data block for the established file in the target block group, and writing the file data into the allocated data block and updating information of the block group allocation table and the superblock; and A3) Judging whether the file has been written completely, if no, skipping to execute Step A1; otherwise, if the file has been written completely, ending and escaping.

Optionally, a detailed step of dynamically establishing or selecting the corresponding block group and allocating the data block according to an appointed data block size in Step 2) comprises:

B1) Assigning a group of monotone increasing data block sizes a0-am, and taking the data block size a0 as the current data block size ai;

B2) Judging whether there is still a block group with the current data block size ai of a spare data block or not, if yes, taking the block group as a target block group, and if no, establishing a new block group with the current data block size, and taking the new block group as the target block group;

B3) Allocating the data block for the established file in the target block group and recording a quantity of the allocated data blocks, writing the file data into the allocated data block and updating information of the block group allocation table and the superblock, and when the quantity of the allocated data blocks is smaller than a preset threshold value n, skipping to execute Step B4); and B4) Judging whether the file has been written completely, if no, selecting the adjacent data block size larger than the current data block size ai from the data block sizes a0-am as a new data block size ai, and skipping to executing Step B2); and otherwise, if the file has been written completely, ending and escaping.

Optionally, after Step B4), the method further comprises a step of calculating an established file size FileSize, wherein a calculating function expression of the file size FileSize is as shown below:

$$FileSize = a_0 \times \sum_{i=0}^{N/n-1} n \times 2^i$$

wherein a0 is an appointed minimum data block size, N represents a sum of the data blocks occupied by one file, and n represents a quantity of the data blocks allocated for one file in each type of data blocks.

Optionally, after Step 2), the method further comprises a step of reading the file or overwriting the file: first, reading a data block pointer table corresponding to the file from the storage device to a memory by a primary IO operation, wherein the data block pointer table is a table composed of block numbers corresponding to N data blocks occupied by the file, and the data block pointer table is stored in index node information of the file system; and then, calculating the data blocks where data, reading the file or overwriting the file, of the file is, and reading or overwriting the data from the obtained data blocks.

Optionally, after Step 2), the method further comprises a file append writing step:

C1) Receiving an append writing request of a file f, wherein a write data length of the append writing request is l bytes;

C2) Judging whether a free space of the last data block in the N data blocks occupied by the file f is larger than or equal to the write data length l of the append writing request or not, if yes, skipping to execute Step C3); and otherwise, skipping to execute Step C4);

C3) Writing the data of l bytes into the allocated data block and ending and escaping;

C4) Writing a part of data into the free space of the last data block in the N data blocks occupied by the file f, and then updating the write data length l of the append writing request, wherein a new value of the write data length l is obtained by subtracting the free space of the last data block in the N data blocks occupied by the file f from an original value;

C5) Allocating a new data block for the file f; and

C6) Adding 1 to the quantity N of the data blocks occupied by the file f, and skipping to execute Step C2).

Optionally, a calculating function expression of the free space of the last data block in the N data blocks occupied by the file f is $$\sum_{i=0}^{N/n-1} n \times 2^i + N \mathbin{\%} n \times 2^{\frac{N}{n}} - L$$

wherein N represents a sum of the data blocks occupied by one file, n represents a quantity of the data blocks allocated for one file in each type of data blocks, and L represents an existing length of the file f.

In addition, the present invention also provides a low-latency file system file address space management system, comprising a computer device, the computer device at least comprising a microprocessor and a memory, the microprocessor of the computer device is programmed or configured to execute the steps of the management method for an address space of a low delay file system according to any one of Claims 1-8 or the memory of the computer device stores a computer program programmed or configured to execute the management method for an address space of a low delay file system.

In addition, the present invention also provides a computer readable storage medium, the computer readable storage medium stores a computer program programmed or configured to execute the management method for an address space of a low delay file system.

Compared with the prior art, the present invention has the advantages that (1) The management method for the address space provided by the present invention may reduce the addressing expenses of reading and writing the file may be remarkably reduced.

The upper application will give offset of the read and written data in the file when reading and writing the file, and the file system needs to determine the data blocks of read and written data on the storage device according to the offset, so that the process is called an addressing process. The addressing process of the Ext file system is exactly a process of searching for multi-stage indirect pointers, and the addressing process of BtrFS is exactly a process of searching for the B+ tree. According to above analysis, the above processes need multiple IO operations, so that the delay of reading and writing data will be remarkably increased. According to the present invention, the sum of the data blocks contained in one file is decreased by using lengthened data blocks and the sum of the data blocks contained in the file is controlled within several hundreds, so that these data block pointers may be read from the storage device by one IO operation, and therefore, the IO operations in the addressing process are remarkably reduced. Further, as the data block pointers occupy relatively small spaces, the file system may even store these data block pointers in the inode of the file. These pointers are read together from the storage device when the inode information is read, so that the IO operations in the addressing process are avoided. In a word, the file system designed by the present invention may remarkably reduce the IO operations in the addressing process, so that the file read-write delay is reduced.

(2) The present invention may remarkably improve the sequence of reading and writing the file, so that the read-write performance is improved. A conventional file system often adopts data blocks with fixed lengths, for example 4 KB data blocks, which makes one file occupy a lot of data blocks. For example, a 4 GB file will occupy a million 4 KB data blocks. Although the file system adopts many optimization measures to improve continuity of the data blocks belonging to a same file on the storage device and there may be concurrent write operations sent by a plurality of applications within a same time period, it is hard to store so many data blocks on the storage device continuously. For most storage devices, continuous read-write performance is remarkably superior to that of random read-write, so that it is critically important to optimize the performance by improving the file storage continuity. It is ensured that several hundreds of data blocks may store files of any size. Thus, the file storage continuity is remarkably superior to that of the conventional file system, so that the continuous read-write advantage of the storage device may be exerted fully.

BRIEF DESCRIPTION OF THE SEVERAL VIEWS OF THE DRAWINGS

In order to describe the technical schemes in the embodiments of the application more clearly, brief introduction on drawings needed to be used in the embodiments will be made below.

It is apparent that the drawings described below are merely some embodiments of the application, and those skilled in the technical field further can obtain other drawings according to the drawings without creative efforts.

DETAILED DESCRIPTION OF THE INVENTION

Description of the present invention in detail will be made below in combination with drawings and specific embodiments. It is to be noted that the critical point of the implementation mode of the present invention lies in how to organize data blocks on a linear address space of a storage device and how to read and write data from a file system. It is relatively simple to read data of one file. It is necessary to calculate data blocks which shall be read according to offset of the read data in the file and the data block pointer table of the file. Overwriting is similar to data reading, and implementation modes under two circumstances are not discussed in detail herein. Emphatic introduction on the organization ode of the data blocks and the implementation modes of append writing are made below.

Figure 1:
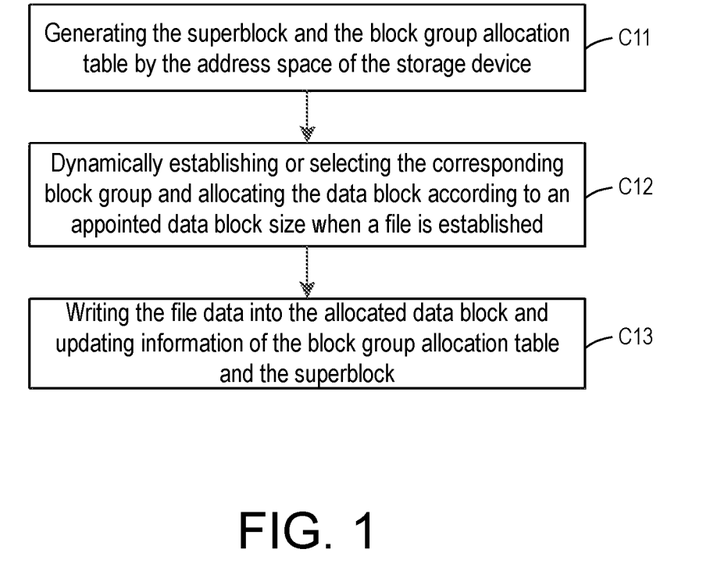
FIG. 1 is a basic flow diagram of a method of an embodiment of the present invention.

As shown in FIG. 1, a management method 1 for an address space of a low delay file system of the embodiment includes implementation steps:

1) A superblock and a block group allocation table are generated by the address space of a storage device (S11), wherein the superblock stores an allocation condition of file system information and blocks on the linear address space of the storage device, and the block group allocation table is configured to mark an allocation condition of data blocks in a corresponding block group; and 2) The corresponding block group and allocating the data block are dynamically established or selected according to an appointed data block size when a file is established (S12), and the file data is written into the allocated data block and information of the block group allocation table and the superblock is updated (S13).

A conventional file system usually formats the storage device into data blocks with fixed lengths, and then divides a lot of data blocks into several block groups. For example, an Ext4 file system formats the storage device into optional 1 KB, 4 KB and 8 KB data blocks, then determines the sizes of the block groups according to the sizes of the data blocks and finally divides the whole storage device into several block groups. XFS further divides a storage space of the device into allocation groups, and each allocation group is equivalent to an independent file system internally. The file systems have the common characteristic that the data blocks are fixed in length, and in order to avoid space waste caused by small files, the sizes of the data blocks are usually set to be smaller than 8 KB. Thus, one big file certainly contains a lot of data blocks. It brings huge expenses to facilitate search by establishing indexes for these data blocks. The embodiment provides a method of lengthening the data blocks, i.e., a method of dividing the address space of the storage device into block groups. The data blocks in each block group are fixed in length. Different block groups may adopt data blocks of different sizes. The corresponding block groups are dynamically established or selected according to the appointed data block size and the data blocks are allocated when the file is established. For example, the data blocks in different block groups may be optionally integer powers of 2 such as 1 KB, 2 KB, 4 KB and 8 KB. The maximum data block may even be set at 512 MB and 1 GB as needed. It is unnecessary to establish the block groups when being initiated but to establish the block groups dynamically in a process of receiving the file according to conditions of demand of the file. Specifically, the user will acquire the data blocks from different block groups as needed when establishing the file. Once the data blocks in one block group are allocated completely, it is necessary to establish a block group with the data blocks in same size again. Once one block group has been established on the storage device, the data block size therein is set and may not be changed. After one block group is destroyed, the occupied storage space may be allocated to other block groups again or new block groups are established, and at the time, the data block size in the block group may be set again. As the data block size in the block group may be appointed, the data block may be very big (rather than data blocks 16 KB below that usually adopted by a conventional file system), so that the file system may store a large file by adopting fewer data blocks. The above optimization measures guarantee that the large file do not need to adopt the multiple indirect pointers to index the data blocks, so that multiple IO operations of the conventional file system to acquire the indirect pointers when reading and writing the large file are avoided.

Figure 2:
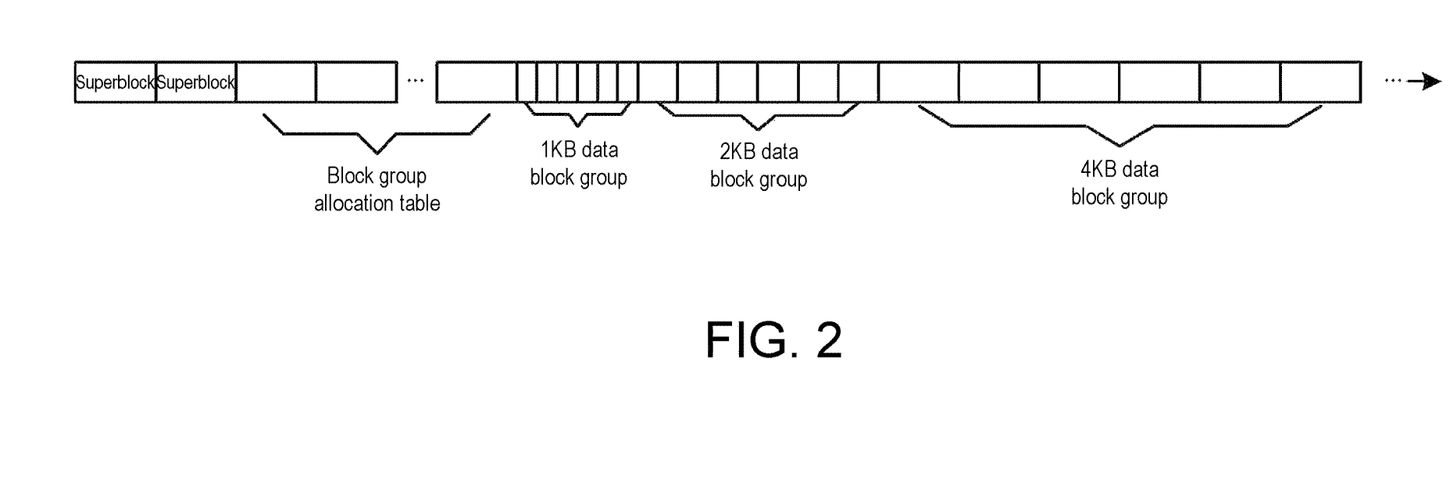
FIG. 2 is address space distribution of a storage device in an embodiment of the present invention.

FIG. 2 is an address space division mode of the storage device in the embodiment. A starting portion of the linear address space has two data blocks for storing two transcripts of a superblock of the file system. The superblock primarily records some basic information of the file system. The allocation condition of the block group on the linear address space of the storage device is further recorded in the superblock. What is behind the superblock is a lot of block group allocation tables, and each block group allocation table is 4 KB. Behind the block group allocation table is a lot of block groups, wherein each block group corresponds to a previous block group allocation table. As a specific optional implementation mode, the block group allocation table in the embodiment is used to identify the allocation condition of the data blocks in the corresponding block group. One byte in the block group allocation table is used to identify one data block in the block group. If the position is 0, the corresponding data block is identified unallocated, and if the position is 1, it is illustrated that the corresponding data block has been allocated. As one block group allocation table is 4 KB, totally containing 32768 bytes, each block group contains 32768 data blocks.

As an optional implementation mode, fixed appointed data block size may be adopted to dynamically establish or select corresponding block group and allocate the data blocks according to the appointed data block size. In the mode, the detail step of dynamically establishing or selecting corresponding block group and allocating the data blocks according to the appointed data block size in Step 2) includes:

A1) Whether there is still a block group with the appointed data block size of a spare data block or not is judged, if yes, the block group is taken as a target block group, and if no, a new block group with the appointed data block size is established, and the new block group is taken as the target block group;

A2) The data block is allocated for the established file in the target block group, and the file data is written into the allocated data block and information of the block group allocation table and the superblock is updated; and A3) Whether the file has been written completely is judged, if no, it is skipped to execute Step A2; otherwise, if the file has been written completely, it is ended and escaped.

After being established, it is necessary to allocate certain blocks for the file to prepare to receive data written by the upper application. The final size of the file may not be determined when the file is initially established. As an optional implementation mode, a conservative policy is adopted to allocate relatively small data blocks thereto. Dynamic changing fixed appointed data block size may be adopted to dynamically establish or select corresponding block group and allocate the data blocks according to the appointed data block size. In the mode, the detail step of dynamically establishing or selecting corresponding block group and allocating the data blocks according to the appointed data block size in Step 2) includes:

B1) A group of monotone increasing data block sizes $a_0$-$a_m$ is assigned, and the data block size $a_0$ is taken as the current data block size $a_i$;

B2) Whether there is still a block group with the current data block size $a_i$ of a spare data block or not is judged, if yes, the block group is taken as a target block group, and if no, a new block group with the current data block size is established, and the new block group is taken as the target block group;

B3) The data block is allocated for the established file in the target block group and a quantity of the allocated data blocks is recorded, the file data is written into the allocated data block and information of the block group allocation table and the superblock is updated, and when the quantity of the allocated data blocks is smaller than a preset threshold value n, it is skipped to execute Step B4); and B4) Whether the file has been written completely is judged, if no, the adjacent data block size larger than the current data block size $a_i$ is selected from the data block sizes $a_0$-$a_m$ as a new data block size $a_i$, and it is skipped to executing Step B2); and otherwise, if the file has been written completely, it is ended and escaped.

For example, for the data block sizes $a_0$-$a_m$ started at $a_0$=1 KB, a conservative policy is adopted first to distribute a 1 KB data block size. As the upper application writes data into the file continuously, the 1 KB small data blocks occupied by the file are increased continuously. When it exceeds a certain threshold value (assuming that it is n), 2 KB data blocks may be allocated thereto. Along with further writing of the data, the 2 KB data blocks occupied by the file further exceed the threshold value n, and 4 KB data blocks may be allocated thereto. By parity of reasoning, along with continuous increase of the file, the data block sizes allocated to the file are increased exponentially, and n data blocks are merely allocated to each type of data blocks. The data block allocation principle guarantees that under a condition that the quantity of the data blocks occupied by one file is increased linearly, the file size may be increased exponentially, so that a very large file may be indexed by adopting fewer data block pointers.

Based on the above-mentioned principle, the file size FileSize may be written in form of a geometric progression for summation. In the embodiment, after Step B4), the method further includes a step of calculating an established file size FileSize, wherein a calculating function expression of the file size FileSize is as shown below:

$$FileSize = a_0 \times \sum_{i=0}^{N/n-1} n \times 2^i$$

wherein $a_0$ is an appointed minimum data block size, N represents a sum of the data blocks occupied by one file, and n represents a quantity of the data blocks allocated for one file in each type of data blocks. It may be seen from the above formula that along with linear increase of N, FileSize will be increased exponentially. Specifically, assuming that n is 4, N and FileSize have a corresponding relation as shown in a table below:

TABLE 1

Corresponding relation between N and FileSize

| N | FileSize |
|---|---|
| 4 | 4 KB |
| 8 | 12 KB |
| 12 | 28 KB |
| 16 | 60 KB |
| 20 | 124 KB |
| 24 | 252 KB |
| 28 | 508 KB |
| 32 | 1020 KB |
| 64 | ≈256 MB |
| 128 | ≈16 TB |

It may be found by observing the table that when a file adopts 128 pointers, the file may reach 16 TB at most, which may meet the demands of most applications. Assuming that each pointer occupies 4 bytes, 128 pointers only occupy 512 bytes. All pointers may be acquired to a memory from the storage device by an IO operation, so that a condition that the Ext file system acquires the indirect pointers layer by layer by multiple IO operations is avoided. The table composed of the block numbers corresponding to N data blocks occupied by one file is called a data block pointer table in the embodiment hereinafter, and in the table, it is recorded that the data corresponding to the file is stored in the data blocks. It is to be noted that as the file sizes are different, the values of N corresponding to the files are different.

In the embodiment, after Step 2), the method further includes a step of reading the file: first, reading a data block pointer table corresponding to the file from the storage device to a memory by a primary IO operation, wherein the data block pointer table is a table composed of block numbers corresponding to N data blocks occupied by the file, and the data block pointer table is stored in index node (inode) information of the file system; and then, calculating the data blocks where data, reading the file, of the file is, and reading the data from the obtained data blocks. When the data is read from one file, the data block pointer table corresponding to the file is acquired first. According to aforementioned analysis, the space occupied by the table does not exceed 512 bytes. Therefore, it may be read to the memory from the storage device by primary IO operation. Specifically, the file system may store the table in the inode information. When the inode of the file is read, the table is read together, which further reduce the IO operation needed by reading the user data. According to the table, the data block where the data with any offset of the file may be calculated, and then the user data may be read from the calculated data block directly.

In the embodiment, after Step 2), the method further includes a step of overwriting the file: first, reading a data block pointer table corresponding to the file from the storage device to a memory by a primary IO operation, wherein the data block pointer table is a table composed of block numbers corresponding to N data blocks occupied by the file, and the data block pointer table is stored in index node information of the file system; and then, calculating the data blocks where data, overwriting the file, of the file is, and overwriting the data from the obtained data blocks.

Figure 3:
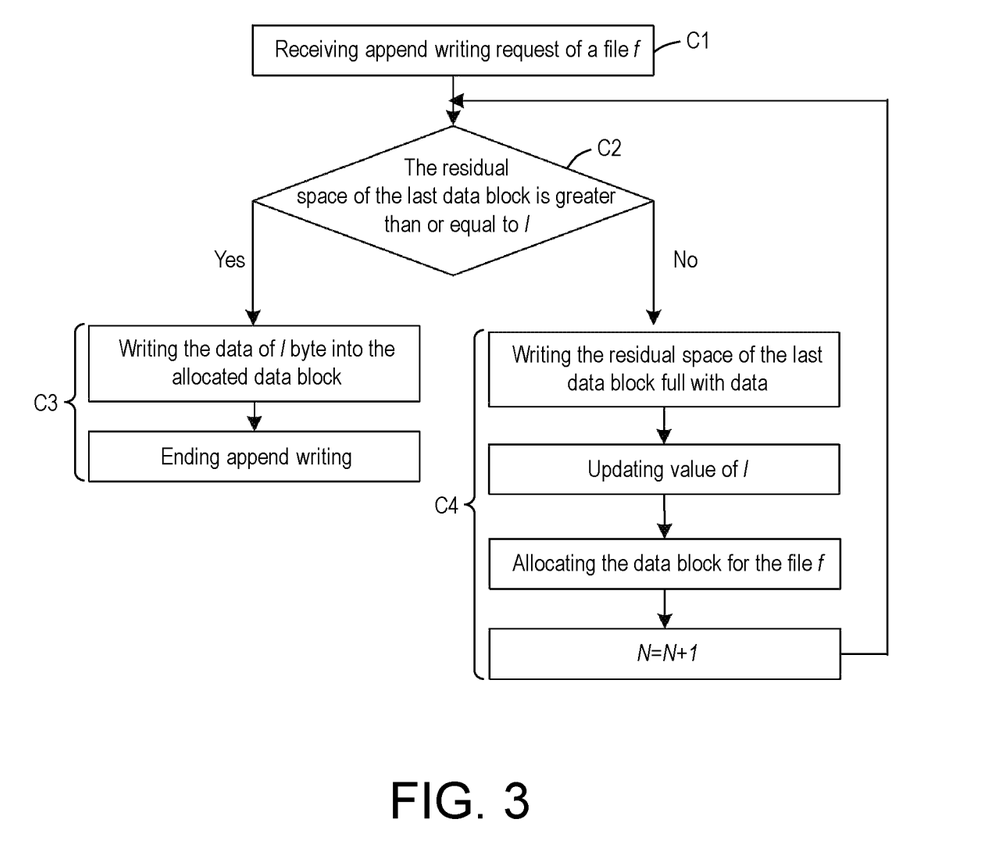
FIG. 3 is a flow diagram of append writing a file in an embodiment of the present invention.

It may have two circumstances when the data is written into one file. The first circumstance is overwriting, i.e., original data is covered on the allocated data blocks of one file, and under such circumstance, it is unnecessary to allocate new data blocks for the file. At the time, data writing is similar to data reading discussed above, and it is only necessary to calculate the target data which shall be written according to the data block pointer table. The second circumstance is append writing, i.e., more data is written to the tail of one file, and under such circumstance, it is required to allocate new data blocks for the file. As shown in FIG. 3, in the embodiment, after Step 2), the method further includes a step of append writing a file:

C1) An append writing request of a file f is received, wherein a write data length of the append writing request is 1 bytes;

C2) Whether a free space of the last data block in the N data blocks occupied by the file f is larger than or equal to the write data length l of the append writing request or not is judged, if yes, it is skipped to execute Step C3); and otherwise, it is skipped to execute Step C4);

C3) The data of l bytes is written into the allocated data block and it is ended and escaped;

C4) A part of data is written into the free space of the last data block in the N data blocks occupied by the file f, and then the write data length l of the append writing request is updated, wherein a new value of the write data length l is obtained by subtracting the free space of the last data block in the N data blocks occupied by the file f from an original value;

C5) A new data block for the file f is allocated; and

C6) 1 added to the quantity N of the data blocks occupied by the file f, and it is skipped to execute Step C2).

It may be probable that the last one data block occupied by the file f is not written full with data, and if the residual space of the last one data block is greater than 1, it is unnecessary to apply a new data block to write the append written data this time into the file. As the file f totally occupies N data blocks, the storage space occupied thereby may be calculated below:

$$\sum_{i=0}^{N/n-1} n \times 2^i + N \% n \times 2^{\frac{N}{n}}$$

wherein N represents a sum of the data blocks occupied by one file, and n represents a quantity of the data blocks distributed for one file in each type of data blocks. Assuming that an existing length of the file f is L, a calculating function expression of the residual space of the last one data block in the N data blocks occupied by the file f is below:

$$\sum_{i=0}^{N/n-1} n \times 2^i + N \% n \times 2^{\frac{N}{n}} - L$$

wherein N represents a sum of the data blocks occupied by one file, n represents a quantity of the data blocks allocated for one file in each type of data blocks, and L represents an existing length of the file f. Therefore, in Step C2), the value is compared with 1. If it is greater than 1, it shows that there is still an enough residual space.

In Step (C4), as there is no enough space for the last data block of the file f to receive data with the length of l, it is only to write a part of additional data into the last data block. As the residual space of the last data block is as shown in the above formula, what is written into the last data block is similarly below:

$$\sum_{i=0}^{N/n-1} n \times 2^i + N \% n \times 2^{\frac{N}{n}} - L$$

a function expression of the written data length l with the append write request is updated below:

$$l = l - \left( \sum_{i=0}^{N/n-1} n \times 2^i + N \% n \times 2^{\frac{N}{n}} - L \right)$$

Assuming that the file has occupied N data blocks, the existing data blocks are sequentially arranged, for example, n 1 KB data blocks, n 2 KB data blocks, n 4 KB data blocks and the like. According to the data block allocation principle provided by the embodiment, the data block size needed to be allocated thereto is $2^{\lfloor N/n \rfloor}$ KB. At the time, an application is filed to the block group with the data block size of $2^{\lfloor N/n \rfloor}$ KB. Once the data blocks are allocated successfully, to be added data may be written into the newly allocated data blocks. Therefore, in Step C5), when the new data block is allocated to the file f, the allocated data block size is $2^{\lfloor N/n \rfloor}$ KB, wherein N represents a sum of the data blocks occupied by one file, and n represents a quantity of the data blocks allocated for one file in each type of data blocks.

As the upper application writes data into the file system continuously, the data blocks in each block group are consumed gradually. When the data blocks on a block group are lower than a set threshold value, it is necessary to allocate a block group with the data blocks same in size again. At the time, a free space may be divided from the storage device to establish a new block group, and information of the block group is recorded in the superblock of the file system.

When the file is deleted, the occupied data blocks are further recovered. If there are requests for writing data into other files, the recovered data blocks are allocated preferentially. However, when the size allocation of the file stored in the file system changes obviously, a condition that a lot of data blocks in one block group are recovered and are not allocated to other files again may happen. For example, a lot of small files are stored in one file system in early stage, which means that the file system establishes a lot of block groups (for example, the block group containing 1 KB data blocks and the block group containing 2 KB data blocks) containing small data blocks. Along with change of load of the upper application subsequently, the small files are deleted gradually, and instead, a lot of large files are established. At the time, the file system needs to establish a lot of block groups containing large data blocks. However, there may be no free space on the storage device to establish new block groups, so that it is required to recover a part of block groups occupied by the small data blocks to establish the block groups containing large data blocks. On the contrary, when a lot of large files are stored in the file system in early stage and a lot of small files are stored in later period, it is necessary to recover a part of block groups occupied by the large data blocks to establish the block groups containing the small data blocks.

When the block groups are recovered, two block groups containing relatively more free data blocks which are same in size are selected first. In the two block groups, assuming that the block group I contains relatively more free blocks, effective data in the block group I is migrated to the block group II because of small migrating expenses. If the effective data in the block group I is migrated completely, the block group may be recovered and re-formatted into other block groups. A block group recovery mechanism guarantees that the file system designed in the present invention may cope with laud change flexibly.

In addition, the embodiment further provides a management system for an address space of a low delay file system, including a computer device, the computer device at least including a microprocessor and a memory, wherein the microprocessor of the computer device is programmed or configured to execute the steps of the management method for an address space of a low delay file system.

In addition, the embodiment further provides a management system for an address space of a low delay file system, including a computer device, the computer device at least including a microprocessor and a memory, wherein the computer device stores a computer program programmed or configured to execute the management method for an address space of a low delay file system.

In addition, the embodiment further provides a computer readable storage medium, where the computer readable storage medium stores a computer program programmed or configured to execute the management method for an address space of a low delay file system.

Those skilled in the art should understand that the embodiment of the application may be provided as a method, a system or a computer program product. Therefore, the present disclosure can adopt the forms of an entirely hardware embodiment, an entirely software embodiment or an embodiment combining hardware and software elements. Furthermore, the application may adopt the form of a computer program product which can be executed by one or more computer usable storage mediums containing computer usable program codes therein (including but not limited to magnetic disk memory, CD-ROM, optical memory and the like). The present invention is described with reference to the flow diagrams and/or block diagrams of the method, equipment (system) and computer program product of the embodiments of the present invention. It is to be understood that each flow and/or block in the flowcharts and/or the block diagrams and a combination of the flows and/or the blocks in the flowcharts and/or the block diagrams may be implemented by computer program instructions. These computer program instructions may be provided for a general-purpose computer, a dedicated computer, an embedded processor or processors of other programmable data processing devices to generate a machine, so that an apparatus for achieving functions designated in one or more flows of the flowcharts and/or one or more blocks of the block diagrams is generated via instructions executed by the computers or the processors of the other programmable data processing devices. These computer program instructions may be provided for a general-purpose computer, a dedicated computer, an embedded processor or processors of other programmable data processing devices to generate a machine, so that an apparatus for achieving functions designated in one or more flows of the flowcharts and/or one or more blocks of the block diagrams is generated via instructions executed by the computers or the processors of the other programmable data processing devices. These computer program instructions may also be stored in a computer readable memory capable of guiding the computers or the other programmable data processing devices to work in a specific mode, so that a manufactured product including an instruction apparatus is generated via the instructions stored in the computer readable memory, and the instruction apparatus achieves the functions designated in one or more flows of the flowcharts/or one or more blocks of the block diagrams.

The above is merely preferred implementation modes of the present invention. The scope of protection of the present invention is not limited to the above embodiment. Technical schemes under the concept of the present invention shall fall into the scope of protection of the present invention. It is to be noted that improvements and embellishments shall be made within the protection range of the disclosure to those skilled in the technical field without departing the principle of the present invention.

What is claimed is:

1. A management method for an address space of a low delay file system, comprising implementation steps:
   1) generating a superblock and a block group allocation table by the address space of a storage device, wherein the superblock stores an allocation condition regarding file system information and blocks on the linear address space of the storage device, and the block group allocation table is configured to mark an allocation condition regarding data blocks in a corresponding block group; and
   2) dynamically establishing or selecting the corresponding block group and allocating the data block according to an appointed data block size when a file is established, and writing file data into the allocated data block and updating information of the block group allocation table and the superblock.

2. The management method for the address space of the low delay file system according to claim 1, wherein the appointed data block size is an integer power of 2 (KB).

3. The management method for the address space of the low delay file system according to claim 1, wherein a detailed step of the dynamically establishing or selecting the corresponding block group and allocating the data block according to an appointed data block size in step 2) comprises:
   A1) judging whether there is still a block group with the appointed data block size of a spare data block or not, if yes, taking the block group as a target block group, and if no, establishing a new block group with the appointed data block size, and taking the new block group as the target block group;

A2) allocating the data block for the established file in the target block group, and writing the file data into the allocated data block and updating information of the block group allocation table and the superblock; and A3) judging whether the file has been written completely, if no, skipping to execute Step A1; otherwise, if the file has been written completely, ending and escaping.

4. The management method for the address space of the low delay file system according to claim 1, wherein a detailed step of the dynamically establishing or selecting the corresponding block group and allocating the data block according to an appointed data block size in step 2) comprises:

B1) assigning a group of monotone increasing data block sizes $a_0$-$a_m$, and taking the data block size $a_0$ as the current data block size $a_i$;

B2) judging whether there is still a block group with the current data block size $a_i$ of a spare data block or not, if yes, taking the block group as a target block group, and if no, establishing a new block group with the current data block size, and taking the new block group as the target block group;

B3) allocating the data block for the established file in the target block group and recording a quantity of the allocated data blocks, writing the file data into the allocated data block and updating information of the block group allocation table and the superblock, and when the quantity of the allocated data blocks is smaller than a preset threshold value n, skipping to execute step B4); and B4) judging whether the file has been written completely, if no, selecting the adjacent data block size larger than the current data block size $a_i$ from the data block sizes $a_0$-$a_m$ as a new data block size $a_i$, and skipping to executing step B2); and otherwise, if the file has been written completely, ending and escaping.

5. The management method for the address space of the low delay file system according to claim 4, wherein after step B4), the method further comprises a step of calculating an established file size FileSize, wherein a calculating function expression of the file size FileSize is as shown below:

$$FileSize = a_0 \times \sum_{i=0}^{N/n-1} n \times 2^i$$

wherein $a_0$ is an appointed minimum data block size, N represents a sum of the data blocks occupied by one file, and n represents a quantity of the data blocks allocated for one file in each type of data blocks.

6. The management method for the address space of the low delay file system according to claim 4, wherein after step 2), the method further comprises a file append writing step:

C1) receiving an append writing request of a file f, wherein a write data length of the append writing request is l bytes;

C2) judging whether a free space of the last data block in the N data blocks occupied by the file f is larger than or equal to the write data length l of the append writing request or not, if yes, skipping to execute step C3); and otherwise, skipping to execute step C4);

C3) writing the data of l bytes into the allocated data block and ending and escaping;

C4) writing a part of data into the free space of the last data block in the N data blocks occupied by the file f, and then updating the write data length l of the append writing request, wherein a new value of the write data length l is obtained by subtracting the free space of the last data block in the N data blocks occupied by the file f from an original value;

C5) allocating a new data block for the file f; and

C6) adding 1 to the quantity N of the data blocks occupied by the file f, and skipping to execute step C2).

7. The management method for the address space of the low delay file system according to claim 6, wherein a calculating function expression of the free space of the last data block in the N data blocks occupied by the file f is $$\sum_{i=0}^{N/n-1} n \times 2^i + N \ \% \ n \times 2^{\frac{N}{n}} - L$$

wherein N represents a sum of the data blocks occupied by one file, n represents a quantity of the data blocks allocated for one file in each type of data blocks, and L represents an existing length of the file f.

8. The management method for the address space of the low delay file system according to claim 1, wherein after step 2), the method further comprises a step of reading the file or overwriting the file: first, reading a data block pointer table corresponding to the file from the storage device to a memory by a primary IO operation, wherein the data block pointer table is a table composed of block numbers corresponding to N data blocks occupied by the file, and the data block pointer table is stored in index node information of the file system; and then, calculating the data blocks where data, reading the file or overwriting the file, of the file is, and reading or overwriting the data from the obtained data blocks.

9. A management system for an address space of a low delay file system, comprising a computer device, the computer device at least comprising a microprocessor and a memory, wherein the microprocessor of the computer device is programmed or configured to execute the steps of the management method for an address space of a low delay file system according to claim 1 or the memory of the computer device stores a computer program programmed or configured to execute the management method for an address space of a low delay file system according to claim 1.

10. A non-transitory computer readable storage medium, wherein the computer readable storage medium stores a computer program programmed or configured to execute the management method for an address space of a low delay file system according to claim 1.

* * * * *